Dec. 22, 1931.  M. E. DUNKLEY  1,837,765
FRUIT FEEDING DEVICE
Filed July 16, 1928  3 Sheets-Sheet 1
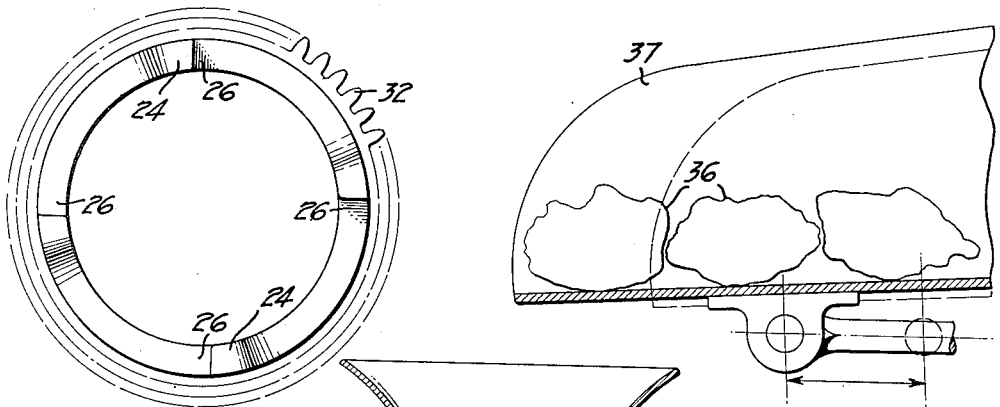
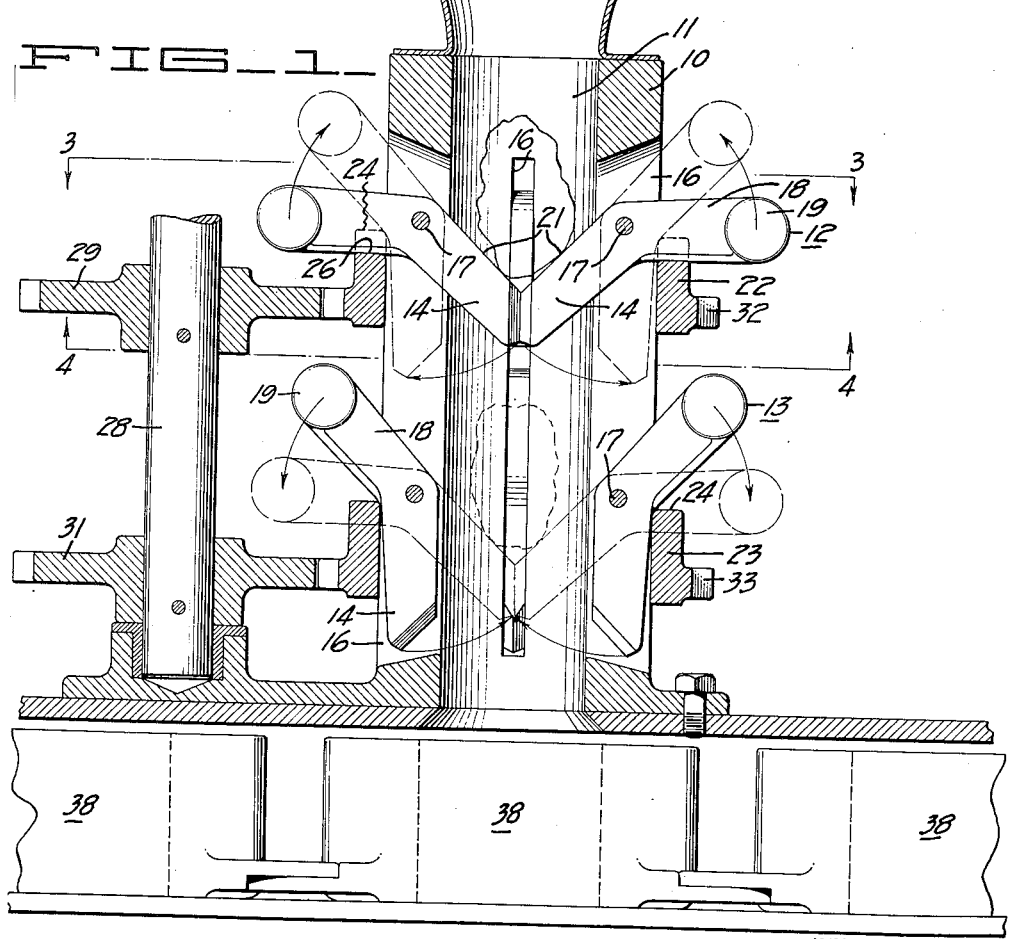
INVENTOR
Melville E. Dunkley
BY
White, Prost & Fryer
ATTORNEYS

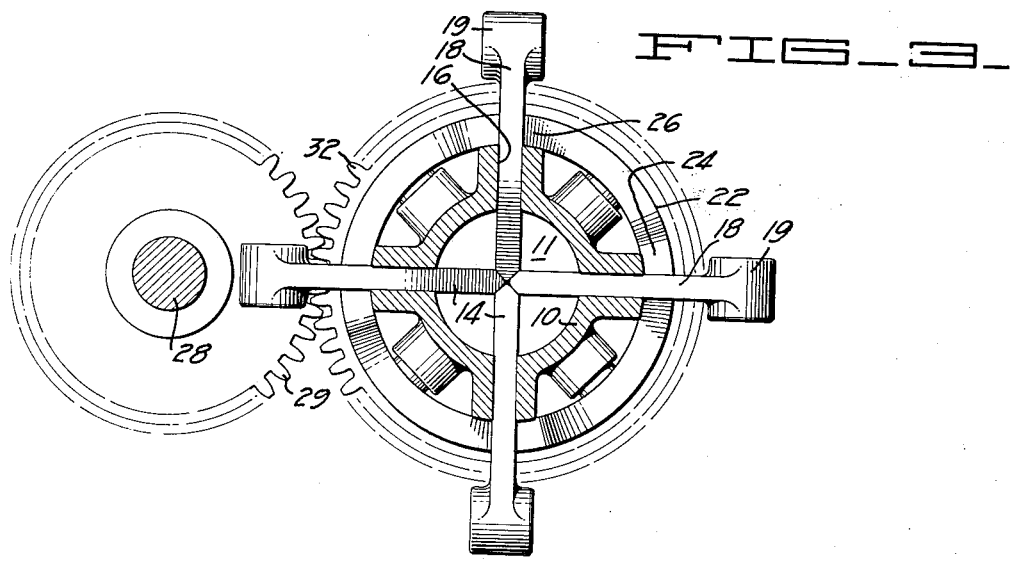
FIG_3_
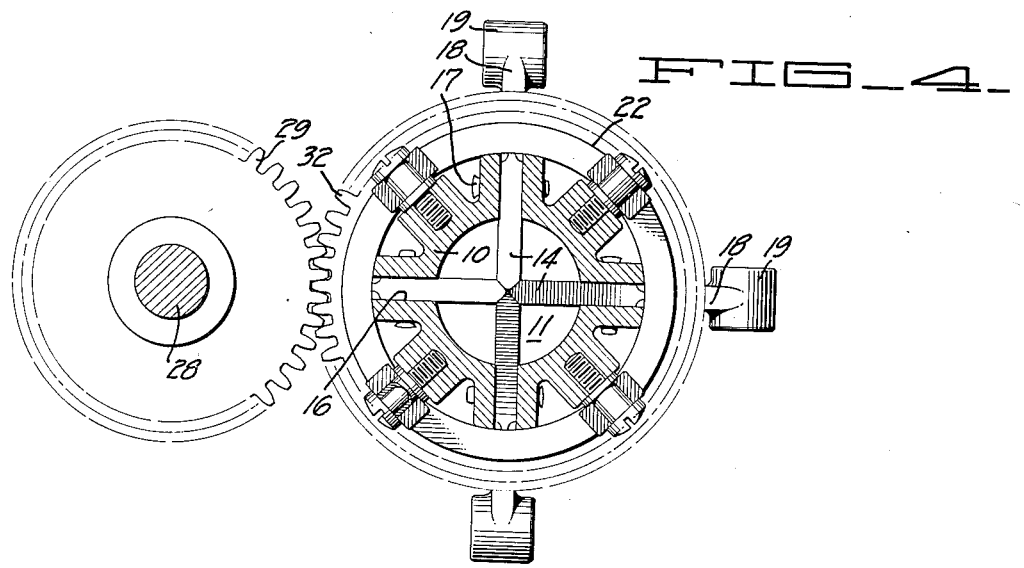
FIG_4_
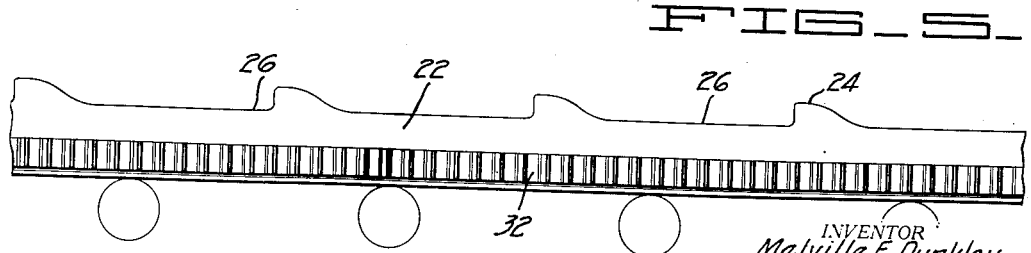
FIG_5_

Dec. 22, 1931.  M. E. DUNKLEY  1,837,765
FRUIT FEEDING DEVICE
Filed July 16, 1928  3 Sheets-Sheet 3
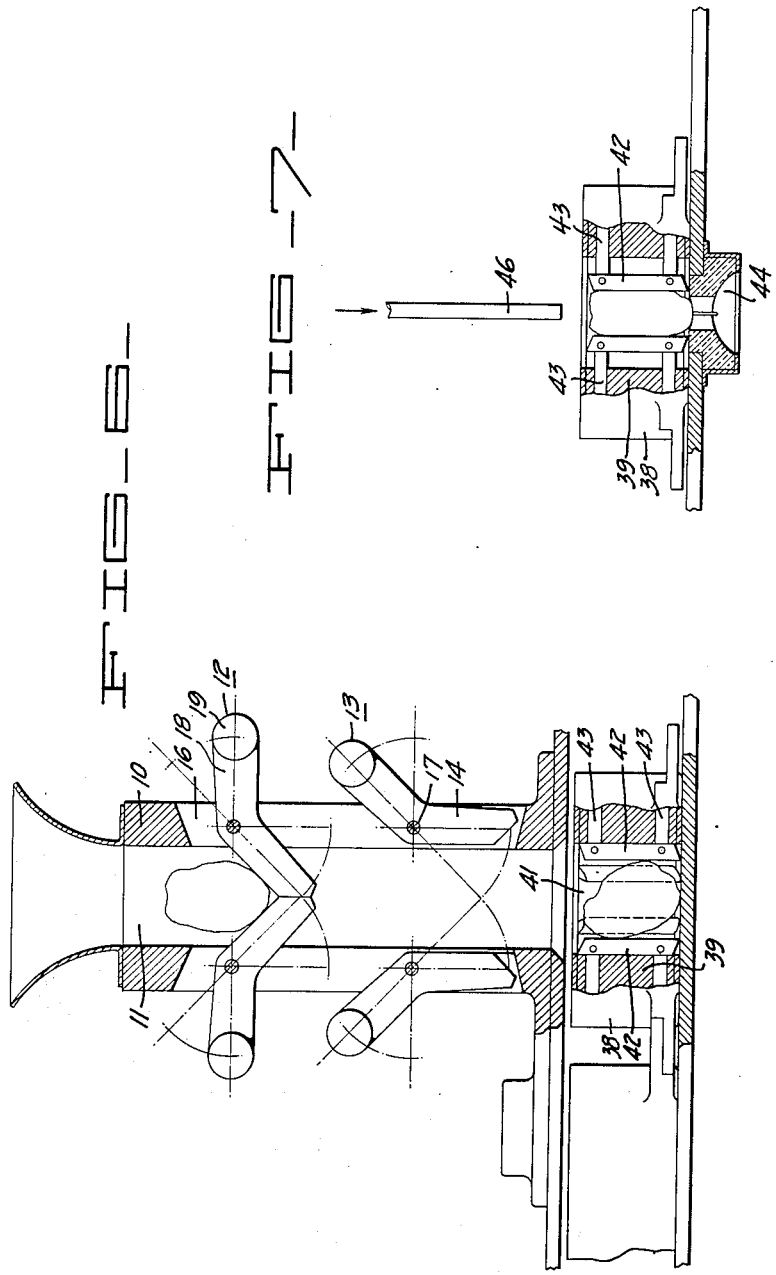
INVENTOR
Melville E. Dunkley
BY
ATTORNEYS Patented Dec. 22, 1931

1,837,765

UNITED STATES PATENT OFFICE

MELVILLE E. DUNKLEY, OF SAN FRANCISCO, CALIFORNIA, ASSIGNOR TO ROSENBERG BROS. AND CO., OF SAN FRANCISCO, CALIFORNIA, A CORPORATION OF CALIFORNIA

FRUIT FEEDING DEVICE

Application filed July 16, 1928. Serial No. 293,202.

This invention relates generally to devices for separating and feeding single articles of fruit to a machine. It is particularly adapted for feeding partially dehydrated fruit such as prunes, to a pitting machine.

It is a general object of this invention to devise a fruit feeding mechanism which will be simple in construction and reliable in operation.

It is a further object of this invention to devise a mechanism particularly adapted for the feeding of partially dehydrated fruit such as prunes.

It is a further object of this invention to devise a feeding mechanism particularly adapted for feeding partially dehydrated fruit to a pitting machine and which will function to deliver the fruit into the machine in generally alined position.

Further objects of the invention will appear from the following description in which I have set forth the preferred embodiment of my invention. It is to be understood that the appended claims are to be accorded a range of equivalents consistent with the state of the prior art.

Referring to the drawings:

Figure 1 is a side elevational view in cross section illustrating the feeding device of this invention in combination with certain parts of a pitting machine.

Fig. 2 is a detail illustrating one of the cam rings incorporated in my device.

Fig. 3 is a cross sectional view taken along the line 3—3 of Fig. 1.

Fig. 4 is a cross sectional view taken along the line 4—4 of Fig. 1.

Fig. 5 is a development of the cam ring shown in Fig. 2.

Fig. 6 is a diagrammatic view illustrating the operation of my device.

Fig. 7 is a diagrammatic view showing the operation of my device in conjunction with certain other mechanism.

By reference to the drawings the embodiment of the invention shown may be described in detail as comprising a body 10 having a passage 11 extending upwardly thru the same. Passage 11 is of sufficient diameter to readily pass the fruit being fed, and since my device is intended principally for use in feeding prunes, the diameter of the passage is such that prunes can be readily dropped thru the same. Means is provided for opening and closing portions of the passage alternately, and this means I prefer to make in the form of two sets of movable fingers which have been designated generally 12 and 13. In the preferred construction of these sets, they each comprise a plurality of individual fingers 14 which are positioned within circumferentially spaced slots 16 formed in body 10. Each finger is pivotally mounted as by means of a pin 17, so that it can be swung inwardly and upwardly toward the central axis of passage 11 or can be swung downwardly to an out of the way position within slots 16. Connected to each finger 14, there is an arm 18 which extends outside of the body 10 and which is provided with a weight 19 in order to yieldingly urge the finger toward closed position, or in other words to a position in which the fingers obstruct the passageway 11. It is to be understood that other means, such as springs, may be employed for yieldingly urging the fingers toward closed position. When the fingers are in closed position, their upper edges 21 preferably slope downwardly and toward the central axis of passage 11.

In order to effect opening of fingers 14, I provide suitable mechanism which in the preferred embodiment of my invention includes a pair of rings 22 and 23 which are journaled upon the body 10. The upper edge of these rings preferably forms a cam surface for engaging and actuating the arms 18, and this cam surface is shown in detail in Fig. 5. Thus raised portions 24 are provided and these portions are separated by depressed portions or notches 26, portions 24 being adapted to be engaged simultaneously by all of the arms 18, as ring 22 is rotated. When arms 18 drop within the notches 26, fingers 14 move to their normal closed position, and when ring 22 is rotated so as to cause arms 18 to ride out of the slots 26 upon raised portions 24, fingers 14 are retracted or are moved to an open position to permit an article of fruit to pass.

As a means for simultaneously rotating the rings 22 and 23, I have shown a shaft 28 carrying a pair of gears 29 and 31, these gears engaging with corresponding gears 32 and 33 provided upon the rings 22 and 23 respectively. Rings 22 and 23 are preferably correlated in such a manner that the upper set of fingers 12 is caused to open only when the lower set 13 is closed, and conversely the lower set of fingers 13 is caused to open only when the upper set 12 is closed.

As my device is intended to be used in combination with a fruit pitting machine, I have shown a line of fruit such as the prunes 36 being fed down a suitable conveyor 37 to be dropped into the upper end of the passage 11. Directly below the passageway 11 I provide suitable devices for receiving the fruit and for carrying it to other parts of the machine. Thus in this case I have shown a plurality of baskets 38 which are adapted to move beneath the passage 11 and which each receive a prune as it is dropped by the feeding device. The baskets 38 are of course moved in synchronism with the feeding device.

In Figs. 6 and 7 I have illustrated diagrammatically the operation of my device. Referring to Fig. 6, when the upper set of fingers 12 is opened mechanically, a prune resting upon these fingers is immediately dropped down upon the closed set 13, after which fingers 12 immediately close. Fingers 13 then open to permit the prune to drop into the basket 38. This basket 38 is preferably similar to that disclosed in the copending application of J. Edwin Sturges, Ser. No. 263,250. In the diagrammatic showing of Fig. 7, basket 38 consists of a body 39 having a central opening 41 for receiving the fruit. Circumferentially spaced about the opening 41, are a plurality of bars 42, and these bars are pivotally secured at their ends to a plurality of radially slidable actuating members 43. After receiving an article of fruit, the basket is presented in alignment with a stripper 44 and pitting plunger 46. The bars 42 are also moved inwardly by the actuating members 43 in order to securely grip the prune.

With a basket of the type described above utilized in a fruit pitting machine, it is desirable to present the prune in a generally upright or alined position. With my feeding apparatus the prunes are presented in this manner since a prune resting upon the fingers 21 tends to take a position with its pits pointed downwardly.

The above device serves to effectively feed fruit at a desired rate and will not readily become inoperative, if an article of fruit should be caught between closing upper fingers 14, the fruit is held until the fingers are released. In such event the fruit skin will not be injured because the fingers are yieldably urged toward closed position. It is to be understood that the biasing effected by weights 19 is sufficient to permit the fingers in closed position to support fruit or to frictionally hold an article of fruit when the fruit is caught between closing fingers.

In order to prevent blocking of passage 11 by fruit, I prefer that this passage be tapered so as to be slightly larger at the bottom than at the top.

I claim:

1. A device for feeding fruit comprising a body formed to provide an upwardly extending passage thru which fruit can pass, a set of movable fingers serving in one position to obstruct a portion of said passage and in another open position to pass fruit, another set of finger spaced below said first fingers serving in closed position to obstruct a lower portion of said passage and in open position to pass fruit, both sets of said fingers being yieldingly urged to closed position, and means for successively moving said fingers to open position whereby the upper set is opened while the lower set is closed and the lower set is opened while the upper set is closed.

2. A device for feeding fruit comprising a body formed to provide an upwardly extending passage thru which fruit can pass, a set of movable fingers serving in one position to obstruct a portion of said passage and in another open position to pass fruit, another set of fingers spaced below said first fingers serving in closed position to obstruct a lower portion of said passage and in open position to pass fruit, the spacing between said sets of fingers being sufficient to contain one article of fruit but not a plurality of articles, and cam means for actuating said fingers whereby the upper set is opened while the lower set is closed and the lower set is opened while the upper set is closed, said cam means including a pair of movable rings surrounding said body.

3. A device for feeding fruit comprising a body formed to provide an upwardly extending passage thru which fruit can pass, a set of movable fingers associated with said body and serving in one position to obstruct said passage and in another open position to pass fruit, another set of fingers spaced below said first fingers serving in closed position to obstruct a lower portion of said passage and in open position to pass fruit, said fingers in closed position being directed downwardly toward the axis of said passage, and means for actuating said fingers to open the upper set while the lower set is closed and to open the lower set while the upper set is closed.

4. A device for feeding fruit comprising a body formed to provide an upwardly extending passage thru which fruit can pass, means serving in one position to obstruct a portion of said passage and in another open position to pass fruit, other means serving to obstruct another portion of said passage when in one position and in another position to pass fruit, means for biasing both said means yieldingly to closed position, and means for overcoming the biasing means to alternately open and close said passage obstructing means.

5. A device for feeding fruit comprising a body formed to provide an upwardly extending passage thru which fruit can pass, means serving in one position to obstruct a portion of said passage and in another open position to pass fruit, other means serving to obstruct another portion of said passage when in one position and in another position to pass fruit, means for biasing both said means yieldingly to closed position, said obstructing means and said biasing means being adapted to retain fruit not passing thru said passage without breaking the skin of the fruit, and means for successively overcoming the biasing means to open and close said passage obstructing means.

6. A device for feeding fruit comprising a body formed to provide a passage serving to align fruit in a substantially predetermined manner, and means movable with respect to said passage for passing single articles of fruit, said means being directed in one position along the axis of said passage to preserve the alignment and to align fruit so that it is delivered in a substantially predetermined position.

In testimony whereof, I have hereunto set my hand.

MELVILLE E. DUNKLEY.